US 7,523,656 B1

(12) United States Patent
Blixhavn et al.

(10) Patent No.: US 7,523,656 B1
(45) Date of Patent: Apr. 28, 2009

(54) TIRE SENSOR SYSTEM AND MONITORING METHOD

(75) Inventors: Bjorn Blixhavn, Tonsberg (NO); Terje Kvisteroy, Horten (NO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 11/933,529

(22) Filed: Nov. 1, 2007

(51) Int. Cl.
*B60C 23/02* (2006.01)
(52) U.S. Cl. ................................ 73/146.5
(58) Field of Classification Search ............ 73/721, 73/727, 146.5
See application file for complete search history.

(56) References Cited

U.S. PATENT DOCUMENTS

| | | | |
|---|---|---|---|
| 4,504,761 A | 3/1985 | Triplett |
| 4,862,486 A | 8/1989 | Wing et al. |
| 5,546,070 A | 8/1996 | Ellmann et al. |
| 5,911,158 A | 6/1999 | Henderson et al. |
| 5,934,882 A | 8/1999 | Olney et al. |
| 6,538,193 B1 | 3/2003 | Fraas |
| 6,666,079 B2 | 12/2003 | Poulbot et al. |
| 7,023,100 B2 | 4/2006 | Vlad |
| 7,047,800 B2 | 5/2006 | Thiesen et al. |
| 7,138,750 B2 | 11/2006 | Mancosu et al. |
| 7,138,911 B2 | 11/2006 | Tyndall |
| 7,222,522 B2 | 5/2007 | Monguzzi et al. |
| 2005/0285728 A1 | 12/2005 | Tyndall |
| 2006/0255663 A1 | 11/2006 | Vlad |

FOREIGN PATENT DOCUMENTS

| | | |
|---|---|---|
| CA | 2189688 | 6/1997 |
| EP | 0887211 | 1/2002 |
| EP | 1612059 | 1/2006 |
| EP | 1650057 | 4/2006 |
| JP | 2003065871 | 3/2003 |
| JP | 2005205956 | 8/2005 |
| WO | 9005646 | 11/1989 |
| WO | 2005067073 | 7/2005 |
| WO | 2007012668 | 2/2007 |

OTHER PUBLICATIONS

Harrison et al., Piezoelectric Polymers, ICASE NASA, Langley Research Center, Dec. 2001, 27 pages.

*Primary Examiner*—Andre J Allen
(74) *Attorney, Agent, or Firm*—Dicke, Billig, Czaja PLLC

(57) ABSTRACT

A tire system includes a plurality of piezoelectric devices mounted to the tire. The piezoelectric devices provide output signals in response to deformation of the tire. A processor has input terminals for receiving the signals from the piezoelectric devices, and the processor is programmed to determine tire parameters in response to the output signals from the piezoelectric devices. A power converter has input terminals for receiving the signals from the piezoelectric devices, and the power converter is connected to the processor to power the processor.

23 Claims, 4 Drawing Sheets

TIRE SENSOR SYSTEM AND MONITORING METHOD

BACKGROUND

Many different types of sensor devices exist for providing information about the tires of a wheeled vehicle. Features such as automatic stability and traction control in cars have made it necessary to obtain information about the interaction between the tires and the road surface. Such information is available from several sources, including ABS sensors, tire pressure measurement systems, and accelerometers and gyros located in the vehicle.

It is also desirable to obtain direct information about the tire-road interface. Known sensors for providing such direct information typically are mounted to the tire in various locations, such as in the tread, sidewall, inflation stem, etc. Existing sensor systems, however, tend to be complicated to operate and difficult to mount to the tire. Further, known tire sensor systems typically use only a single sensor attached to the tire lining or embedded in the tread. This limits the amount of data available for analysis. In particular, it is desirable to observe the tire deformation at both the sidewalls and in the tread, and to be able to observe short-term fluctuations (less than one wheel revolution) in the forces between tire and road.

Moreover, such sensors require an energy source to power the device—typically a battery. Eliminating the battery as the energy source for tire-mounted sensors is desirable from cost, reliability and environmental standpoints.

For these and other reasons, there is a need for the present invention.

SUMMARY

In accordance with embodiments of the invention, a tire system includes a plurality of piezoelectric devices mounted to the tire. The piezoelectric devices provide output signals in response to deformation of the tire. A processor has input terminals for receiving the signals from the piezoelectric devices, and the processor is programmed to determine tire parameters in response to the output signals from the piezoelectric devices. A power converter has input terminals for receiving the signals from the piezoelectric devices, and the power converter is connected to the processor to power the processor.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. Regarding embodiments disclosed, the term "exemplary" is merely meant as an example, rather than the best or optimal. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. In addition, while a particular feature or aspect of an embodiment may have been disclosed with respect to only one of several implementations, such feature or aspect may be combined with one or more other features or aspects of the other implementations as may be desired and advantageous for any given or particular application. The following detailed description, therefore, is not to be taken in a limiting sense, and the scope of the present invention is defined by the appended claims.

Figure 1:
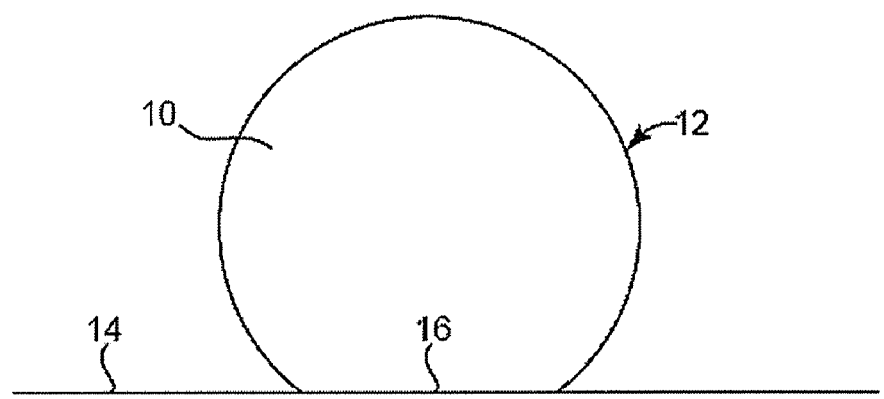
FIG. 1 is a block diagram conceptually illustrating aspects of a typical tire.

Many different types of wheeled vehicles use pneumatic tires (in this specification, the term tire generally refers to a pneumatic tire). Typically, a tire is mounted on the rim of a vehicle wheel and is in contact with a surface upon which the vehicle travels, such as a road surface. FIG. 1 conceptually illustrates portions of a typical tire. The tire 10 includes an outer periphery 12 that typically has a tread formed about its circumference for contacting an underlying surface 14. The outer peripheral portion 12 has a constant circumferential length which is substantially round. However, under vehicle load, the outer periphery 12 has a flattened area 16 at the tire-to-road surface interface. The portion 16 of a tire that is in actual contact with the road surface—the bearing surface of the tire 10—is referred to as the contact area.

Determining the length of a tire's contact area 16, or bearing surface, can be used to calculate desired tire parameters and accordingly, can provide much useful information about the tire. For example, the shape or length of the contact area can have a great effect on the handling of the vehicle to which the tire is mounted. The length of the contact area varies in relation to the inflation pressure of the tire under a constant vehicle load. Thus, if the vehicle load is constant, increasing the inflation pressure shortens the contact area, and decreasing the inflation pressure lengthens the contact area.

Figure 2:
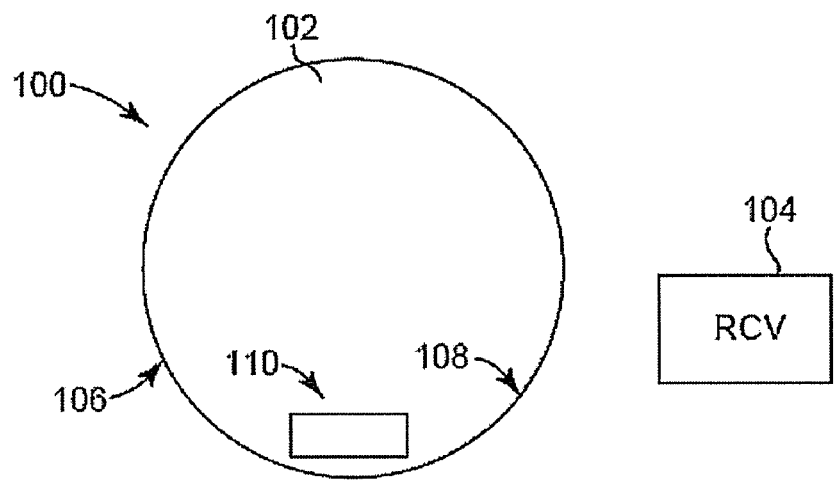
FIG. 2 is a block diagram conceptually illustrating portions of a tire system in accordance with exemplary embodiments of the present invention.

FIG. 2 is a block diagram conceptually illustrating a tire system 100 in accordance with embodiments of the present invention. The system 100 includes a tire 102 with a sensor system 110 that transmits information about the tire 102 to a receiver 104. The receiver 104 can be located in a vehicle to which the tire 102 is mounted, or it can be separate from any such vehicle. Information can be transmitted from the sensor system 110 to the receiver 104 in any suitable manner. The sensor system 110 outputs signals representing desired parameters of the tire 102, such as information about the contact area, sidewall deflection, tire pressure, etc.

Figure 3:
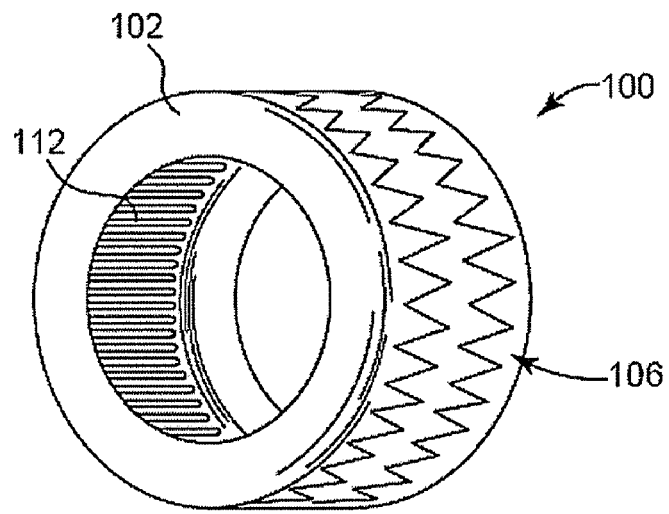
FIG. 3 is a perspective view of a tire, illustrating further aspects of a tire system accordance with exemplary embodiments of the present invention.
Figure 4:
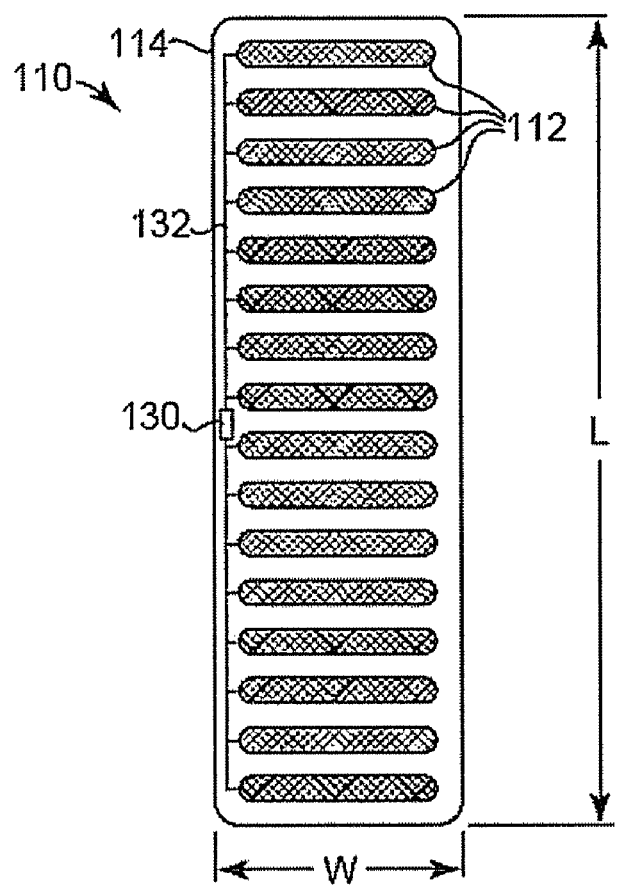
FIG. 4 is a top view schematically illustrating an exemplary embodiment of a sensor system in accordance with aspects of the present invention.

In exemplary embodiments of the invention, the sensor system 110 includes a plurality of piezoelectric devices mounted on the inner surface 108 of the tire 102. FIG. 3 conceptually illustrates further aspects of the tire system 100, showing piezoelectric devices 112 mounted to the inside surface 108 of the tire 102, opposite the tread 106. FIG. 4 illustrates an embodiment of the sensor system 110, in which the piezoelectric devices 112 are situated on a flexible substrate 114 that is mountable to the inside surface 108 of the tire 102. The substrate 114 may be a flexible film made from a suitable plastic material.

Figure 5:
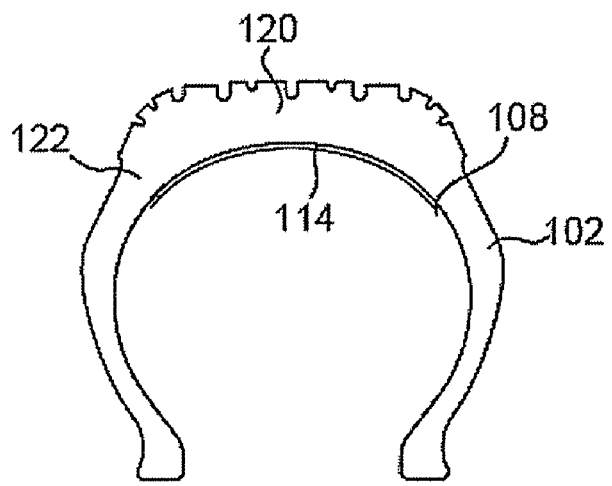
FIG. 5 is a sectional end view illustrating a portion of a tire having a sensor system mounted to an inside surface thereof in accordance with embodiments of the present invention.

FIG. 5 is an end view illustrating a portion of the tire 102 with the substrate 114 mounted to the inside surface 108 with an adhesive, for example. Portions of the inner surface 108 opposite portions of the tire that are not under a load are generally radiused as shown in the top portion of the tire 102 shown in FIG. 5. Portions of the tire 102 in the contact area 16, however, deform when under load. A piezoelectric device generates an electric potential in response to an applied mechanical stress. If the material is not short-circuited, the applied charge induces a voltage across the material. Thus, the piezoelectric devices 112 can detect deformation of portions of the tire 102 in contact with the road as it rotates, generating a voltage in response to this deformation. The piezoelectric devices 112 are connected to an electronics module 130, which includes a processing device such as a digital signal processor (DSP), microcontroller or microprocessor, via conductors 132. In accordance with certain aspects of the invention, the processing device calculates information regarding selected parameters of the tire in response to signals received from the piezoelectric devices.

The terms "coupled," "connected," along with derivatives and other similar terms are meant to indicate that the relevant elements co-operate or interact with each other regardless of whether they are in direct physical or electrical contact. Furthermore, it should be understood that embodiments of the invention may be implemented in discrete circuits, partially integrated circuits or fully integrated circuits and/or software.

Figure 6:
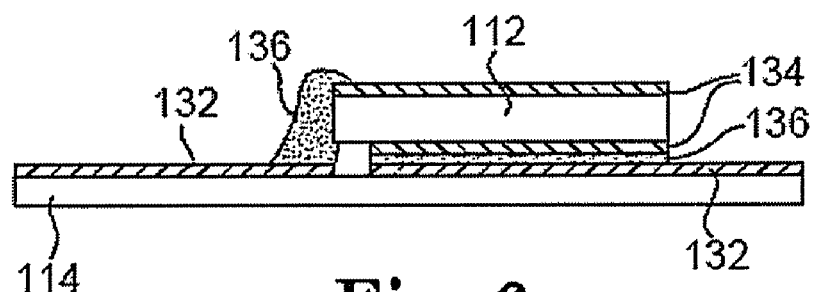
FIG. 6 is a sectional view of portions of an exemplary embodiment of a sensor system in accordance with aspects of the present invention.

FIG. 6 is a sectional end view illustrating further aspects of the exemplary sensor system 110. The piezoelectric devices 112 are sandwiched between conductive layers 134 acting as electrodes on both sides of the piezoelectric devices 112. The electrodes 134 are connected to the conductors 132 on the substrate 114 with conductive glue 136, such as silver-filled epoxy. Alternatives to the conductive glue 136 include solder materials or metal sheet laser weld connections. Further embodiments are envisioned wherein several piezoelectric devices 112 are attached on top of each other to create a multi-layer piezoelectric structure with increased output voltage.

Figure 7:
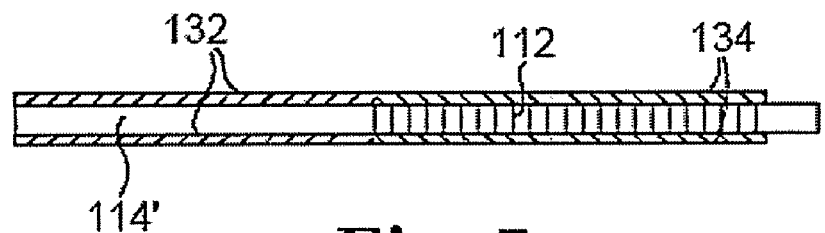
FIG. 7 is a sectional view of portions of another exemplary embodiment of a sensor system in accordance with aspects of the present invention.

FIG. 7 illustrates another embodiment that uses a substrate 114 made from PVDF (Polyvinylidene Fluoride), a material that can be polarized to exhibit piezoelectric properties. This makes it possible to create the piezoelectric devices 112 in the substrate 114 itself, rather than attaching separate devices to the substrate 114. The PVDF substrate 114' has conductive layers added on both sides to form both the electrodes 134 and the conductors 132. It is possible to polarize the PVDF film 114' only under the electrodes 134, so that the signal from the piezoelectric devices 112 is not influenced by strain in the PVDF film 114' under the conductors 132.

Figure 8:
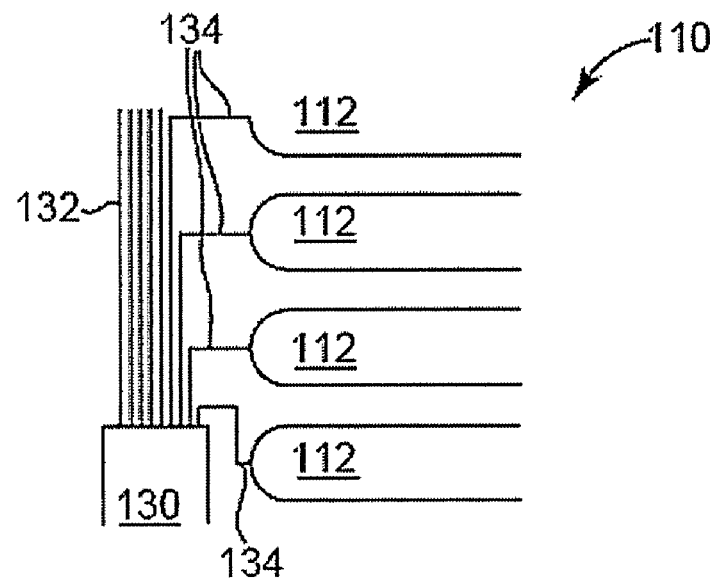
FIG. 8 illustrates a portion of an exemplary sensor system, showing connections between piezoelectric devices an electronics module in accordance with exemplary embodiments of the present invention.

FIG. 8 illustrates a portion of the sensor system 110, showing some of the piezoelectric devices 112 and the electronics module 130. One electrode 134 of each piezoelectric device 112 is connected separately by a conductor 132 to the electronics module 130. The other electrode (not shown in FIG. 8) of each piezoelectric device 112 is connected to a common terminal. In the embodiments illustrated in FIGS. 6 and 7, the bottom electrode 134 is common to all the piezoelectric devices 112, and is connected to the common input of the electronics module 130. The reverse arrangement with the common electrode on top is equally possible.

Figure 9:
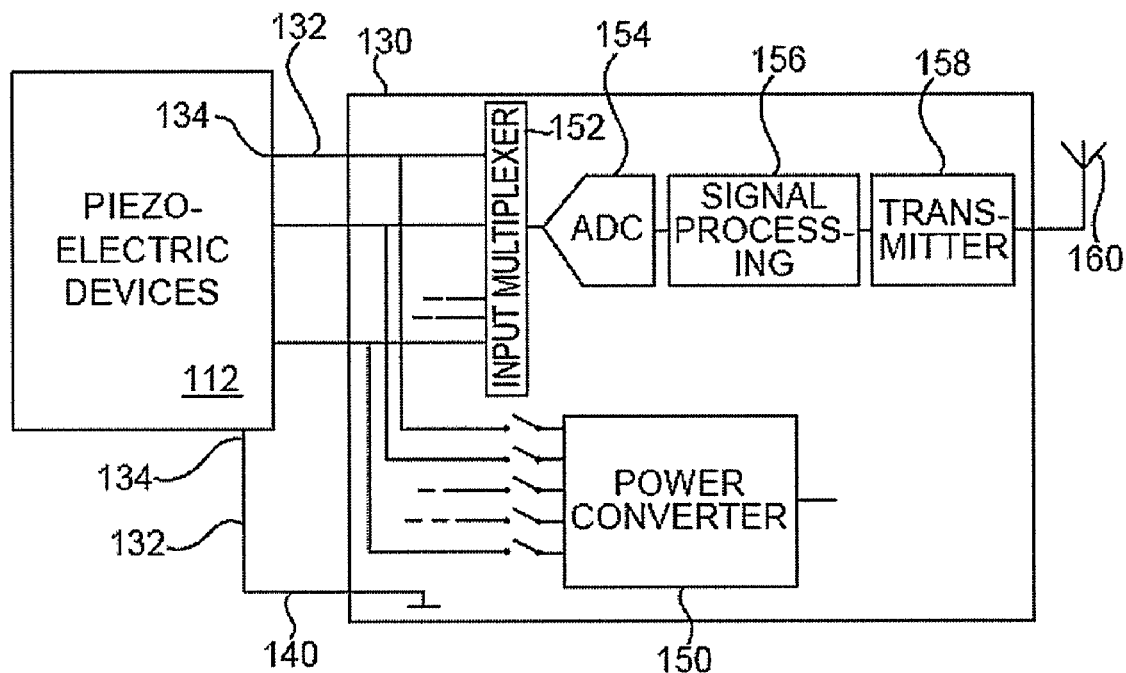
FIG. 9 is a block diagram conceptually illustrating portions of an electronics module in accordance with exemplary embodiments of the present invention.

FIG. 9 is a block diagram conceptually illustrating portions of the electronics module 130. As noted above, each of the piezoelectric devices 112 has one electrode 134 connected to a common terminal 140 of the electronics module 130. The other electrode 134 of the piezoelectric devices 112 is connected to an input terminal of the electronics module 130, where it splits, with one branch leading to input switches of a power conversion unit 150, which is designed to convert the output of the piezoelectric devices 112 to a low impedance power supply suitable to power other portions of the electronics module 130. The other branch of electrodes 134 is received by an input multiplexer 152, which provides an output received by a digital-to-analog converter 154. A signal processing unit 156 receives the output of the digital-to-analog converter 154 and is programmed to calculate the desired tire parameters in response to signals provided by the piezoelectric devices 112. The electronic module 130 may contain additional circuits and sensors, such as temperature sensors and/or a pressure sensor, for example. Data output by the signal processing unit 156 are received by a transmitter 158, which sends the data via an antenna 160 to the receiver 104, which is typically situated in the vehicle upon which the tire is mounted. In certain embodiments, the antenna 160 is implemented in the form of conductors placed on the substrate 114. Additional processing of the tire data can be accomplished by further processing devices associated with the receiver 104. The input to the input multiplexer 152 has a high impedance so that it does not consume a significant portion of the energy generated by the piezoelectric film of the piezoelectric devices 112.

Figure 10:
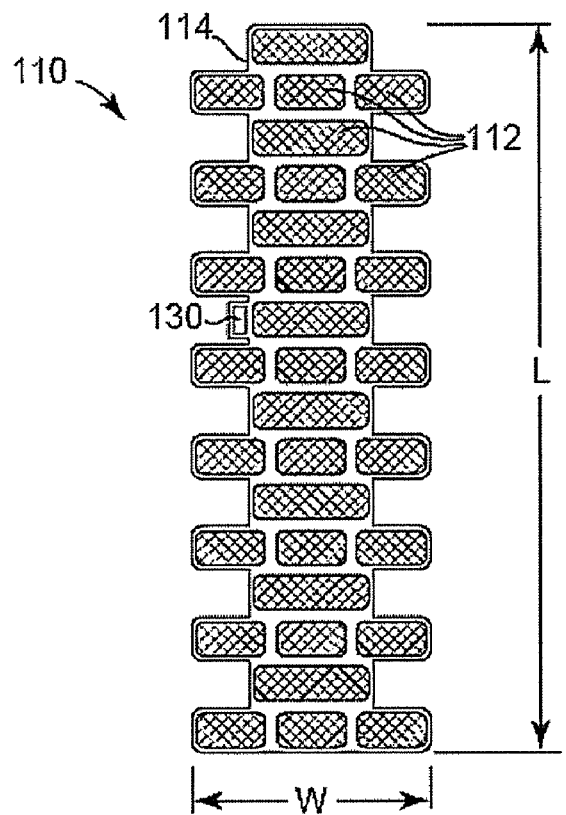
FIG. 10 is a top view schematically illustrating an exemplary embodiment of an alternative sensor system in accordance with aspects of the present invention.

FIG. 10 illustrates an exemplary alternative layout of the piezoelectric devices 112. The devices 112 can be made in various shapes and located at various positions inside the tire or on the substrate 114 so as to be most sensitive to tire deformation in a particular area of the tire 102. Further, the substrate 114 may have a varying width, as shown in FIG. 10, to adapt better to the curved interior surface 108 of the tire 102. As shown in FIG. 10, some of the piezoelectric devices 112 would be situated primarily in the tread area 120, while others would be situated primarily in the sidewall area 122.

In the exemplary systems 110 shown in FIGS. 4 and 10, the piezoelectric devices 112 are laid out on the substrate 114 to essentially cover the full inner circumference of the inside surface 108 in the longitudinal direction (direction the tire rotates, up-and-down the page in FIGS. 4 and 10). As shown in FIG. 5, in some embodiments, the piezoelectric devices 112 are further situated to extend between the central tread area 120 and the region between tread and sidewall 122 in the direction transverse to the longitudinal axis. Accordingly, the substrate 114 illustrated in the embodiments shown in FIGS. 4 and 10 defines a longitudinal length L (up and down the page) that is substantially larger than the transverse width dimension W. The illustrated piezoelectric devices 112 extend across the substrate 114 in the width direction W (across the drawing page).

Moreover, the piezoelectric devices 112 in the embodiments illustrated in FIGS. 4 and 10 are arranged generally symmetrical in both the L and W directions. This facilitates gathering of data relating to the entire tire. For example, the relatively small size of the piezoelectric device 112 in the longitudinal direction makes it possible to determine the shape and size of the contact area with good accuracy, and the electronics module 130 can switch among the piezoelectric devices 112 at a rate proportional to the wheel rotation frequency, such that the area under observation remains at one position irrespective of wheel rotation.

Thus, when the tire 102 rotates during driving of the vehicle, the part of the tire 102 in contact with or close to the road surface is subject to stress which acts to deform the tire 102. The piezoelectric devices 112 will also be deformed, the deformation primarily taking the form of a flexing of the elements 112. This generates a voltage signal on the electrodes 134 of the piezoelectric devices 112. The voltage is proportional to the flexing of the piezoelectric device 112, thereby providing a signal indicative of the mechanical deformation of the tire 102. By selectively placing the piezoelectric devices 112 on different parts of the substrate 114, signals can be obtained that contain information about the deformation of different areas of the tire 102.

The input multiplexer 152 enables the signal processing unit 156 to select the signal from any of the piezoelectric devices 112 for analysis. Thus, by appropriately operating the input multiplexer 152, the processing device can receive output signals from selected ones of the piezoelectric devices. Such analyses can include, for example, Detection of the time when an electrode enters and leaves the contact area between the road and the tire. This will, after one or more iterations, provide information about the wheel rotation period and a first estimate of the size of the contact area.

Detection of signals from electrodes which are placed in the transition zone between tire tread and sidewall. This will provide information about the deformation of the sidewall, which is related to the air pressure of the tire and the dynamic forces due to linear and angular acceleration of the vehicle.

Detection of difference signals between electrodes which are placed in the transition zones between tire tread and the inner and outer sidewalls. This provides additional information about forces acting on the wheel.

Detection of signals from electrodes placed on the tread. This will provide information about the contact between the tire and the road.

After the tire rotation period has been measured, it is possible for the signal processing electronics to lock onto the contact area of the tire 102 by switching the input multiplexer 152 to new piezoelectric devices 112 as they arrive at the contact area 16, selectively connecting the output of the appropriate piezoelectric devices 112 to the signal processing unit 156. A continuous monitoring of the tire contact area 16 is therefore possible during driving.

The operation of the power converter 150 runs in parallel to the signal processing unit 156 and associated devices, and is synchronized such that information from the piezoelectric devices 112, in the form of voltage levels, is read by the signal processing electronics before the charge associated with the signal voltage is transferred to the power converter 150. Depending on the placement of the piezoelectric devices 112, the maximum signal may occur as the piezoelectric device 112 enters or leaves the contact zone 16, or at some point between these two events. The timing of the power converter 150 is therefore programmed in accordance with the layout of the piezoelectric devices 112 and the desired signal processing.

Alternative embodiments of the invention are envisioned where the substrate 114 does not cover the whole length of the inner surface 108 nor the whole width. Such implementations will not be able to continuously monitor the contact area. However, if the area covered by the piezoelectric devices 112 corresponds to more than the maximum deformed area in the contact area, much information is available even if only sampled once per wheel rotation.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A tire sensor system, comprising:
   a substrate;
   a plurality of piezoelectric devices attached to the substrate, each of the piezoelectric devices having an output terminal;
   a processing device connected to the output terminals of the piezoelectric devices, the processing device being programmed to receive output signals from selected ones of the piezoelectric devices; and
   a power converter connected to receive signals from the output terminals of the piezoelectric devices to power the processing device.

2. The tire sensor system of claim 1, wherein the substrate defines a longitudinal axis, and wherein the piezoelectric devices are symmetrically situated about the longitudinal axis.

3. The tire sensor system of claim 1, wherein the piezoelectric devices are spaced apart from one another on the substrate.

4. The tire sensor system of claim 1, wherein the piezoelectric devices include piezoelectric material situated between first and second conductive layers.

5. The tire sensor system of claim 1, wherein the substrate includes a PVDF material, and wherein the piezoelectric devices are formed from the PVDF material sandwiched between conductive layers.

6. The tire sensor system of claim 1, further comprising a transmitter for transmitting data to a receiver.

7. The tire sensor system of claim 1, wherein the processing device includes an input multiplexer connected to the output terminals of the piezoelectric devices, and wherein the processing device is programmed to operate the input multiplexer to receive signals from selected ones of the piezoelectric devices in response to rotation of a tire having the sensor system mounted therein.

8. A tire system, comprising:
   a tire;
   a plurality of piezoelectric devices mounted to the tire, the piezoelectric devices adapted to provide output signals in response to deformation of the tire;

a processor having input terminals for receiving the signals from the piezoelectric devices, wherein the processor is programmed to determine tire parameters in response to the output signals from the piezoelectric devices;

a power converter having input terminals for receiving the signals from the piezoelectric devices, wherein the power converter is connected to the processor to power the processor.

9. The tire system of claim 8, wherein the piezoelectric devices are mounted on a flexible substrate, and wherein the flexible substrate is mounted to an inside surface of the tire.

10. The tire system of claim 8, wherein the piezoelectric devices are formed from a PVDF material sandwiched between conductive layers.

11. The tire system of claim 8, wherein the piezoelectric devices are spaced apart from one another and are situated symmetrically about an inside surface of the tire.

12. The tire system of claim 8, wherein at least some of the piezoelectric devices are situated on an inside surface of the tire opposite a tread defined on an outside portion of the tire.

13. The tire system of claim 8, wherein at least some of the piezoelectric devices are situated on an inside surface of the tire opposite a sidewall of the tire.

14. The tire system of claim 8, wherein the processing device is connected to receive the output signals from the piezoelectric devices via an input multiplexer, and wherein the processing device is adapted to operate the input multiplexer to receive the output signals from selected ones of the piezoelectric devices in response to a rotation frequency of the tire.

15. The tire system of claim 8, further comprising:

a transmitter receiving an output of the processing device; and a receiver situated outside the tire for receiving data from the transmitter.

16. A method for monitoring a tire, comprising:

mounting a plurality of piezoelectric devices to a tire;

selectively connecting predetermined ones of the plurality of piezoelectric devices to a processing device to receive signals generated in response to deformation of a portion of the tire;

calculating predetermined parameters of the tire in response to the received signals;

selectively connecting predetermined ones of the plurality of piezoelectric devices to a power converter; and providing an output from the power converter to the processing device to power the processing device.

17. The method of claim 16, wherein mounting the plurality of piezoelectric devices to the tire includes:

mounting the piezoelectric devices on a substrate; and mounting the substrate to an inside surface of the tire.

18. The method of claim 16, wherein mounting the plurality of piezoelectric devices to the tire includes mounting at least some of the piezoelectric devices to an inside surface of the tire opposite a tread defined on an outside surface of the tire.

19. The method of claim 16, wherein mounting the plurality of piezoelectric devices to the tire includes mounting at least some of the piezoelectric devices to an inside surface of the tire in a sidewall area of the tire.

20. The method of claim 16, wherein mounting the plurality of piezoelectric devices to the tire includes mounting the piezoelectric devices symmetrically about a longitudinal axis of an inside surface of the tire.

21. The method of claim 16, further comprising transmitting the calculated parameters to a receiver situated outside the tire.

22. The method of claim 16, wherein selectively connecting predetermined ones of the plurality of piezoelectric devices to the processing device includes connecting the predetermined ones of the plurality of piezoelectric devices to the processing device in response to a rotation frequency of the tire.

23. A tire system, comprising:

a tire;

first means for generating signals in response to deformation of portions of the tire;

second means connected to the first means for determining tire parameters in response to the signals from the first means;

third means connected to the first means for powering the second means.

* * * * *

UNITED STATES PATENT AND TRADEMARK OFFICE
CERTIFICATE OF CORRECTION

| | | |
|---|---|---|
| PATENT NO. | : 7,523,656 B1 | |
| APPLICATION NO. | : 11/933529 | |
| DATED | : April 28, 2009 | |
| INVENTOR(S) | : Bjoern Blixhavn et al. | |

It is certified that error appears in the above-identified patent and that said Letters Patent is hereby corrected as shown below:

Title Page, item [75] Inventors, delete "Bjorn Blixhavn" and insert in place thereof
--Bjoern Blixhavn--.

Signed and Sealed this
Third Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,523,656 B1 | Page 1 of 1 |
| APPLICATION NO. | : 11/933529 | |
| DATED | : April 28, 2009 | |
| INVENTOR(S) | : Bjorn Blixhavn et al. | |

It is certified that error appears in the above-identified patent and that said Letters Patent is hereby corrected as shown below:

Title page, item [75] Inventors, delete "Terje Kvisteroy" and insert in place thereof
--Terje Kvisteroey--.

Signed and Sealed this
Sixteenth Day of August, 2011

David J. Kappos
*Director of the United States Patent and Trademark Office*